United States Patent
Starodoumov et al.

(10) Patent No.: US 7,385,752 B1
(45) Date of Patent: Jun. 10, 2008

(54) DISPOSAL OF RESIDUAL RADIATION FROM A FREQUENCY-CONVERSION PROCESS

(75) Inventors: Andrei Starodoumov, Cupertino, CA (US); Andreas Diening, Palo Alto, CA (US)

(73) Assignee: Coherent, Inc., Santa Clara, CA (US)

( * ) Notice: Subject to any disclaimer, the term of this patent is extended or adjusted under 35 U.S.C. 154(b) by 0 days.

(21) Appl. No.: 11/888,257

(22) Filed: Jul. 31, 2007

(51) Int. Cl.
*G02F 1/35* (2006.01)
*H01S 3/10* (2006.01)

(52) U.S. Cl. ............... 359/326; 359/328; 359/330; 372/22; 372/34

(58) Field of Classification Search ........ 359/326–332; 372/21, 22, 34
See application file for complete search history.

(56) References Cited

U.S. PATENT DOCUMENTS

| 5,159,487 A * | 10/1992 | Geiger et al. ............... 359/330 |
| 6,775,315 B1 | 8/2004 | Nield et al. ................. 372/109 |
| 6,791,743 B2 * | 9/2004 | Jovanovic et al. .......... 359/333 |
| 7,139,115 B2 | 11/2006 | Schilling-Benz et al. ... 359/330 |

* cited by examiner

*Primary Examiner*—Hemang Sanghavi
(74) *Attorney, Agent, or Firm*—Stallman & Pollock LLP

(57) ABSTRACT

A frequency-conversion arrangement including one or more optically nonlinear crystals is located in an enclosure. Radiation residual from the frequency conversion is directed into an optical fiber having one end in the enclosure for receiving the residual radiation and an opposite end outside of the enclosure for disposing of the residual radiation outside of the enclosure.

8 Claims, 3 Drawing Sheets

DISPOSAL OF RESIDUAL RADIATION FROM A FREQUENCY-CONVERSION PROCESS

TECHNICAL FIELD OF THE INVENTION

The present invention relates in general to frequency-conversion of fundamental radiation from a laser or optical amplifier. The invention relates in particular to disposal of residual unconverted radiation from such frequency conversion.

DISCUSSION OF BACKGROUND ART

In laser applications such as laser machining, lithography, and optical inspection, not all wavelengths of interest can be supplied as fundamental radiation from commercially available lasers. In such cases radiation having a desired wavelength is provided by frequency-converting the fundamental radiation in one or more optically nonlinear crystals. Such frequency-conversion includes frequency-multiplication, for example, frequency-doubling tripling or quadrupling, also referred to as harmonic-generation. Frequency conversion also includes sum and difference frequency generation. Frequency conversion further includes parametric conversion, which can be referred to as frequency division, wherein radiation having a first frequency is converted into radiation at two other frequencies, the sum of which is equal to the first frequency.

Frequency-quadrupling is typically accomplished using two frequency-doubling stages. By way of example, fundamental radiation of a neodymium-doped yttrium aluminum garnet (Nd:YAG) laser at a wavelength of 1064 (nanometers) nm is converted to radiation (second-harmonic radiation) having a wavelength of 532 nm in a first frequency-doubling stage and the 532-nm radiation is converted to (fourth-harmonic) radiation having a wavelength 266 nm in a second stage. Further, by way of example, a lithium borate (LBO) crystal can be used for the second-harmonic conversion and a cesium lithium borate (CLBO) can be used for the fourth harmonic conversion.

Most frequency-conversion processes in an optically nonlinear crystal have a conversion-efficiency, at most, of about 50%. Accordingly, conversion-efficiency in multiple optically nonlinear crystals is significantly less. In the above-discussed example of frequency-quadrupling of 1064-nm radiation from a Nd:YAG laser, conversion-efficiency is between 5% and 25%, for example 40 Watts (W) of optical power at 1064 nm will provide only about 10 W or less of 266-nm radiation. The residual optical power at 1064 nm and 532 nm has to be disposed of ("dumped"), generating heat.

Usually, the crystal or crystals used for frequency conversion, and optical components for focusing radiation into the crystal or crystals, are contained in a hermetically sealed enclosure. Hermetic sealing is useful because the crystals are best protected from environmental contamination.

Different methods have been used to dump residual power. One of these methods is to direct the residual radiation onto a highly scattering surface or bulk material, such as a ceramic, within the enclosure. This scatters the residual radiation in all directions and minimizes the possibility of local heating anywhere in the enclosure. This method is primarily used to dump visible and infrared radiation. Scattered ultraviolet (UV) radiation may cause accelerated photo-degradation of components inside the frequency-conversion enclosure.

Another method is to direct the residual radiation out of the enclosure. This method, however, requires additional optical components to steer the residual radiation within the enclosure and one or more optical windows in the enclosure to allow the radiation to escape. In addition the enclosure must be configured such that there an unimpeded optical path or optical paths to the window or windows.

In yet another method radiation is directed into a radiation-absorbing device or beam-dump within the enclosure. The beam-dump is typically connected to a heat sink that is usually water-cooled or air-cooled. Water-cooling adds complexity and cost, as materials have to be selected for seals and the like that will not generate contaminants within the enclosure. Heat removed by air-cooling is deposited within the enclosure and can heat the enclosure to a temperature at which the conversion efficiency of the crystals is reduced.

There is a need for a simple method and apparatus for disposing of residual radiation power from an enclosure in which frequency-conversion in optically nonlinear crystals is carried out. Preferably, the method should minimize generation of heat within the enclosure.

SUMMARY OF THE INVENTION

The present invention is directed to a method and apparatus for disposing of residual radiation from a frequency conversion process. In one aspect, apparatus in accordance with the present invention comprises an enclosure and an optical fiber having an input end within the enclosure and an output end without the enclosure. An optically nonlinear crystal is located in the enclosure and arranged to convert radiation having a first frequency to radiation having a second frequency different from the first frequency. The conversion has an efficiency less than 100%, such that a residual portion of the first-frequency radiation is not converted into second-frequency radiation. An arrangement is provided for directing the residual portion of the first-frequency radiation into the input end of the optical fiber, whereby the residual portion of the first frequency radiation is guided by the optical fiber out of the enclosure.

BRIEF DESCRIPTION OF THE DRAWINGS

The accompanying drawings, which are incorporated in and constitute a part of the specification, schematically illustrate a preferred embodiment of the present invention, and together with the general description given above and the detailed description of the preferred embodiment given below, serve to explain principles of the present invention.

DETAILED DESCRIPTION OF THE INVENTION

Figure 1:
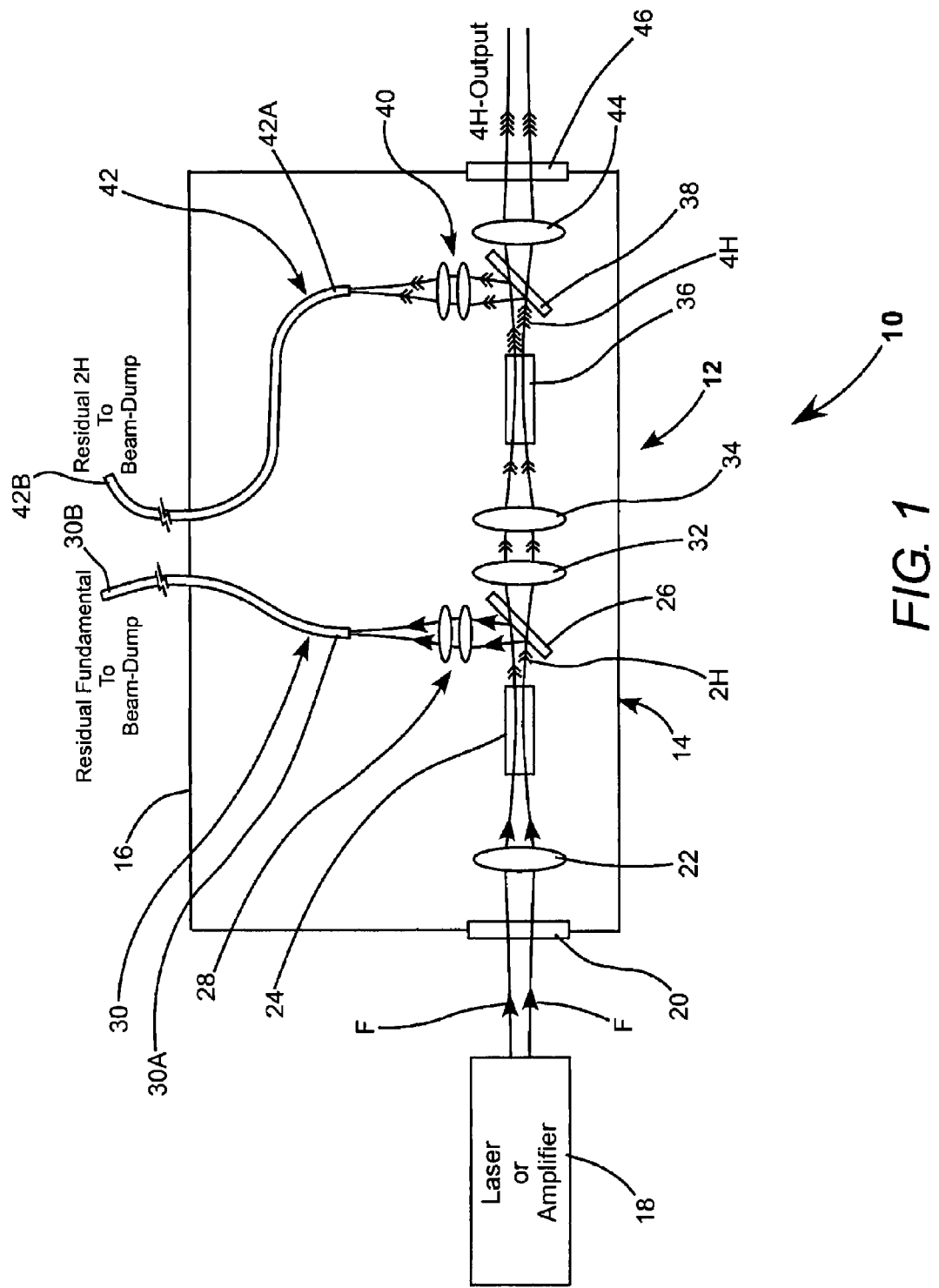
FIG. 1 schematically illustrates a preferred embodiment of apparatus in accordance with the present invention including a laser delivering fundamental radiation to two optically nonlinear crystals in an enclosure for frequency-doubling and subsequent frequency-quadrupling, with optical fibers arranged to guide un-converted fundamental radiation and unconverted frequency-doubled radiation from the enclosure for disposal outside of the enclosure.

Referring now to the drawings, wherein like components are designated by like reference numerals, FIG. 1 schematically illustrates one preferred embodiment 10 of apparatus in accordance with the present invention. Apparatus 10 includes a harmonic-generator 12 having an enclosure 14 in which are located an optically nonlinear crystal 24 and an optically nonlinear crystal 36. A laser or amplifier 18 delivers fundamental radiation F (indicated by a single solid arrow) to the harmonic-generator.

Radiation enters enclosure 14 via a window 20 therein. A lens 22 within the enclosure focuses the fundamental radiation into optically nonlinear crystal 24, which is arranged for frequency-doubling. Frequency-doubled radiation (indicated by double open arrowheads 2H) and residual fundamental radiation are incident on a dichroic beam splitter 26. Beamsplitter 26 transmits the frequency-doubled radiation and reflects residual fundamental radiation. The reflected fundamental radiation is transmitted by a doublet lens 28 into input end 30A of an optical fiber 30. Optical fiber 30 is arranged to pass through an aperture (not explicitly shown) in wall 16 of enclosure 14 such that the output end 30B of the fiber is outside of the enclosure, and can deliver the residual fundamental radiation to a beam dump (not shown) remote, if necessary, from the enclosure.

Frequency-doubled radiation transmitted by dichroic mirror 26 is refocused by lenses 32 and 34 into optically nonlinear crystal 36, which is arranged for frequency-doubling the already-frequency doubled radiation, thereby generating frequency-quadrupled radiation (with the multiple, here, referred to the fundamental frequency). Frequency-quadrupled radiation (indicated by quadruple open arrowheads 4H) and residual frequency-doubled radiation are incident on a dichroic beamsplitter 38. Beamsplitter 38 transmits the frequency-quadrupled radiation and reflects residual frequency-doubled (2H) radiation. The frequency-quadrupled radiation is collimated by lens 44 and exits enclosure 14 via window 46 therein. The reflected frequency-doubled radiation is transmitted by a doublet lens 40 into input end 42A of an optical fiber 42. Optical fiber 40 is arranged to pass through an aperture (not explicitly shown) in wall 16 of enclosure 14 such that the output end 42B of the fiber is outside of the enclosure, and can deliver the residual fundamental radiation to a beam dump (not shown) remote, if necessary, from the enclosure.

It should be noted here that lenses referred to above in connection with apparatus 10, and below with reference to other embodiments of the inventive apparatus, are illustrated schematically for simplicity of illustration and may have one, two, or more optical elements. Those skilled in the art will recognize that any desired lens arrangement can be selected without departing from the spirit and scope of the present invention.

One skilled in the art will understand that the subject invention will not be able to remove all of the residual radiation from the enclosure. More specifically, the dichroic mirrors 26 and 38 will not reflect one-hundred percent of the unconverted light. Similarly, the optics for coupling the light into the end of the fibers are not one-hundred percent efficient. Ideally, the system will be configured to extract at least the majority of the unconverted light from the enclosure and the claims should be interpreted in that light.

Figure 2:
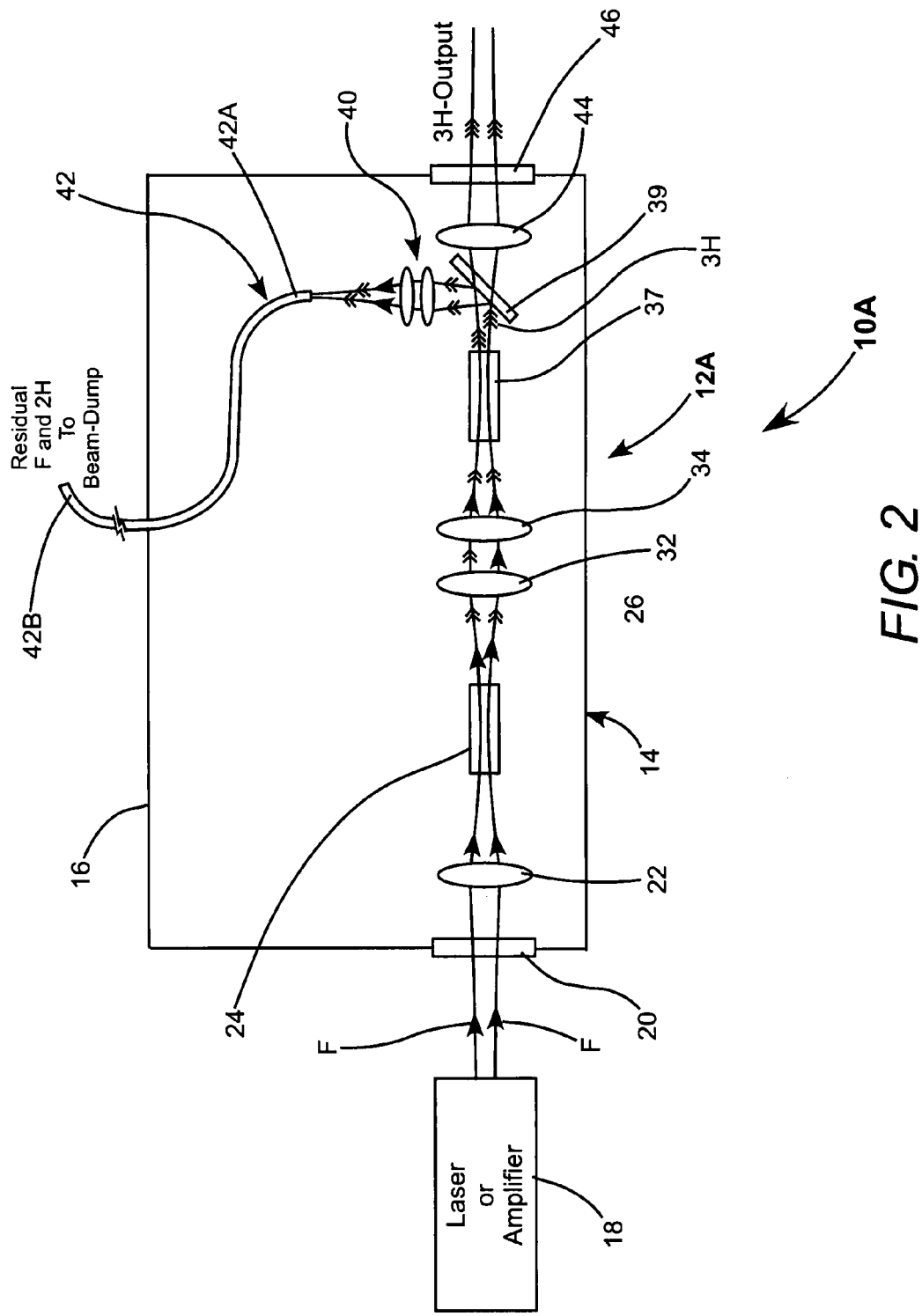
FIG. 2 schematically illustrates another preferred embodiment of apparatus in accordance with the present invention including a laser delivering fundamental radiation to two optically nonlinear crystals in an enclosure for frequency-doubling and subsequent frequency-tripling, with one optical fiber arranged to guide both un-converted fundamental radiation and unconverted frequency-doubled radiation from the enclosure for disposal outside of the enclosure.

FIG. 2 schematically illustrates another preferred embodiment 10A of apparatus in accordance with the present invention. Apparatus 10A is similar to apparatus 10 of FIG. 1 with an exception that harmonic-generator 12 thereof is replaced in apparatus 10A with a harmonic-generator 12A arranged for generating frequency-tripled radiation. In this regard, residual fundamental radiation from the frequency-doubling in crystal 24 is not disposed of, but is focused into an optically nonlinear crystal 37, which is arranged to generate frequency-tripled radiation (designated by triple open arrowheads 3H) by sum-frequency mixing the fundamental and second-harmonic (2H) radiation. A dichroic beamsplitter 39 transmits the 3H-radiation which is collimated by lens 44 and exits enclosure 14 via window 46 therein. Beamsplitter 39 reflects residual fundamental and 2H-radiation to a lens 40, which focuses the residual radiations into input end 42A of optical fiber 42 for disposal outside of the enclosure.

Figure 3:
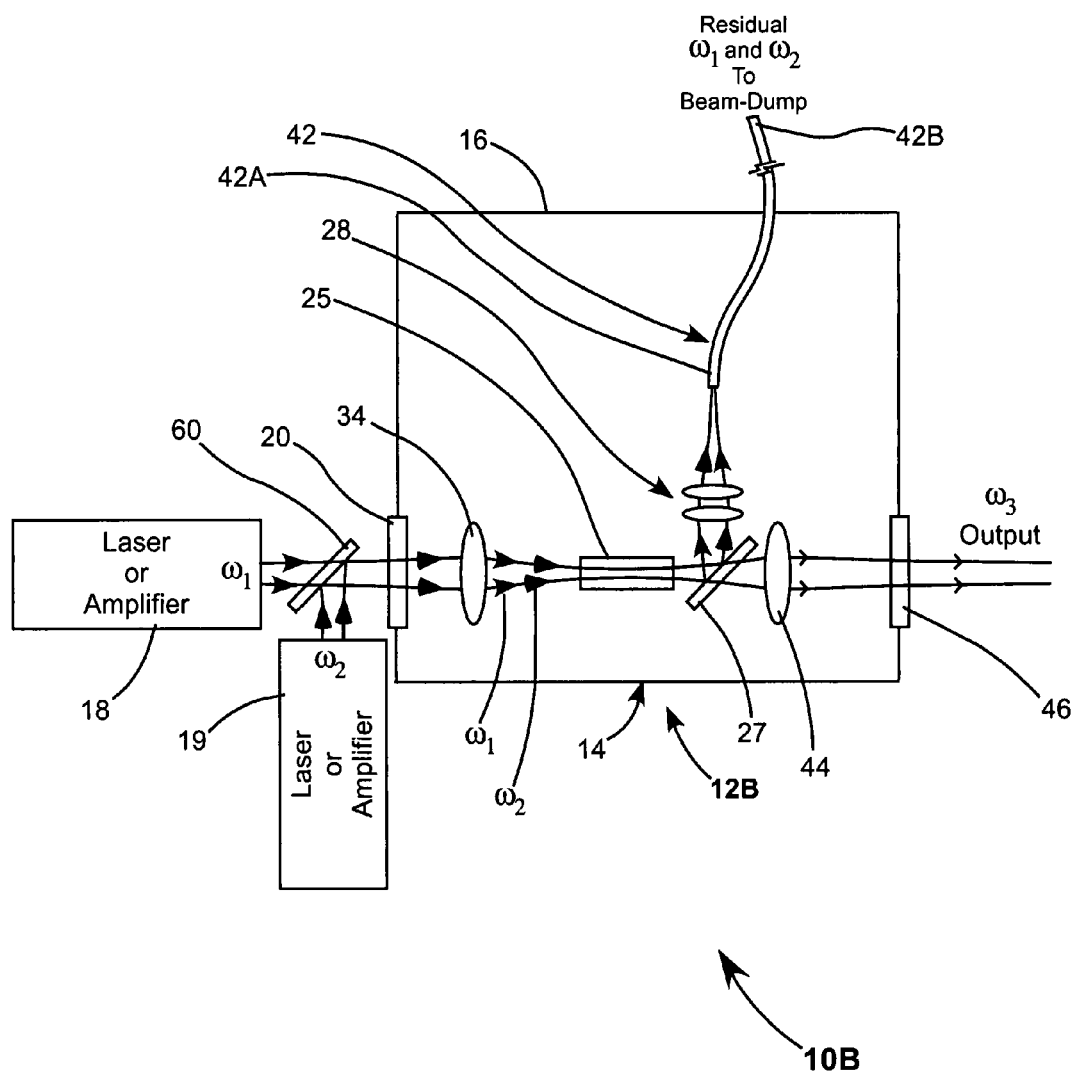
FIG. 3 schematically illustrates yet another preferred embodiment of apparatus in accordance with the present invention including first and second lasers delivering fundamental radiation having respectively first and second different fundamental frequencies to one optically nonlinear crystal in an enclosure for sum frequency mixing the first and second fundamental frequencies to provide sum-frequency output, with one optical fiber arranged to guide both un-converted first-fundamental-frequency radiation and unconverted second-fundamental-frequency radiation from the enclosure for disposal outside of the enclosure.

FIG. 3 schematically illustrates yet another embodiment 10B of apparatus in accordance with the present invention. Apparatus 10B is similar to apparatus 10 of FIG. 1 with an exception that harmonic-generator 12A thereof is replaced in apparatus 10A with a harmonic-generator 12B arranged for generating sum-frequency radiation from fundamental radiation having a frequency $\omega_1$ delivered by laser 18 and fundamental radiation having a frequency $\omega_2$ delivered by a laser 19. Solid arrowheads of different shape designate the different fundamental radiation frequencies. In this apparatus, only one non-linear crystal 25 is required and therefore enclosure 14 can be correspondingly smaller than in apparatus 10A. Beams from lasers 18 and 19 are combined on a common path by a beamsplitter 60 and directed into enclosure 14 via window 20 therein. The combined beams are focused by lens 34 into an optically nonlinear crystal 25 arranged for sum-frequency mixing the two fundamental frequencies to provide radiation having a frequency $\omega_3$ equal to $\omega_1+\omega_2$. A dichroic beamsplitter 27 transmits the $\omega_3$-radiation which is collimated by lens 44 and exits enclosure 14 via window 46 therein. Beamsplitter 27 reflects residual $\omega_1$ and $\omega_2$-radiation to lens doublet 28, which focuses the residual radiations into input end 42A of optical fiber 42 for disposal outside of the enclosure.

It should be noted here that beam-combining beamsplitter 60 can be a dichroic beamsplitter or a polarizing beamsplitter depending on whether sum-frequency mixing in crystal 25 is selected to be type-I mixing or type-II mixing. Further, those skilled in the art will recognize without further illustration or detailed description that apparatus similar to apparatus 10B can be arranged for difference-frequency mixing by selection of an appropriate optically nonlinear crystal.

The present invention is described above with reference to three particular examples of frequency-conversion with an enclosure. In each case, radiation residual from a frequency-conversion process is directed into an optical fiber having one end within the enclosure and an opposite end without the enclosure. An advantage of this arrangement is that no free optical path to a window in enclosure wall is required to dispose of the residual radiation outside of the enclosure. Further, a beam dump located outside of the enclosure for trapping the residual radiation can be remote from the enclosure and does not need to be aligned in any particular way with the enclosure. While in the embodiments disclosed there are no more than two conversion stages in any one example the invention is applicable to frequency conversion arrangements wherein there are three or more conversion stages, including combinations of harmonic generation (frequency-multiplication) and sum-frequency mixing. The invention is also independent of the type of laser or lasers delivering radiation into the enclosure. In a multiple conversion arrangement there may be more than one enclosure, with radiation being delivered from one enclosure to another for further conversion.

In summary, the present invention is described above in terms of a preferred and other embodiments. The invention is not limited, however, to the embodiments described and depicted. Rather, the invention is limited only by the claims appended hereto.

What is claimed is:

1. Frequency-conversion apparatus, comprising:
    an enclosure;
    an optical fiber having an input end within said enclosure and an output end without said enclosure;
    an optically nonlinear crystal located in said enclosure and arranged to convert radiation having a first frequency to radiation having a second frequency different from said first frequency, said conversion having an efficiency less than 100% such that a residual portion of said first-frequency radiation is not converted into second-frequency radiation; and
    an arrangement for directing said residual portion of said first-frequency radiation into the input end of said optical fiber, whereby said residual portion of said first frequency radiation is guided by said optical fiber out of said enclosure.

2. The apparatus of claim 1, wherein first-frequency radiation to be converted by said optically nonlinear crystal is directed into said enclosure from without said enclosure.

3. The apparatus of claim 2, wherein said first frequency radiation directed into said enclosure is fundamental-frequency radiation delivered from one of a laser and an optical amplifier.

4. The apparatus of claim 3, wherein said optically nonlinear crystal is a first of two optically nonlinear crystals, and said optical fiber is the first of two optical fibers each thereof having an input end within the enclosure and an output end without the enclosure; wherein the second of the two optically nonlinear crystals is arranged to convert radiation having said second-frequency to radiation having a third frequency different from said first and second frequencies, said second-to-third-frequency conversion having an efficiency less than 100% such that a residual portion of said second-frequency radiation is not converted into third-frequency radiation, and wherein there is an arrangement for directing a residual portion of said second-frequency radiation into the input end of said second optical fiber, whereby said residual portion of said second-frequency radiation is guided by said optical fiber out of said enclosure.

5. The apparatus of claim 4, wherein said second-frequency is twice said fundamental frequency, and said third frequency is four times said fundamental frequency.

6. In a laser system having a non-linear crystal for converting radiation having a first wavelength into radiation having a second wavelength and wherein said non-linear crystal is mounted within a housing, a method for managing first wavelength radiation that has been transmitted by the crystal but has not been converted, said method comprising the steps of:
    separating the unconverted first wavelength radiation from the converted second wavelength radiation after passing through the crystal; and
    transporting the separated unconverted first wavelength light radiation out of the housing via an optical fiber.

7. A method as recited in claim 6, wherein said separating step is performed with a dichroic mirror.

8. A method as recited in claim 7, wherein said fiber has an input end positioned to receive the unconverted first wavelength radiation separated by said filter and an output end positioned outside of said enclosure.

* * * * *